(12) United States Patent
Bury

(10) Patent No.: US 8,394,191 B2
(45) Date of Patent: Mar. 12, 2013

(54) RHEOLOGY MODIFYING ADDITIVE FOR CEMENTITIOUS COMPOSITIONS

(75) Inventor: Jeffrey R. Bury, Mantua, OH (US)

(73) Assignee: Construction Research & Technology GmbH (DE)

( * ) Notice: Subject to any disclaimer, the term of this patent is extended or adjusted under 35 U.S.C. 154(b) by 890 days.

(21) Appl. No.: 11/999,429

(22) Filed: Dec. 5, 2007

(65) Prior Publication Data

US 2008/0156225 A1 Jul. 3, 2008

Related U.S. Application Data

(60) Provisional application No. 60/873,110, filed on Dec. 6, 2006.

(51) Int. Cl.
*C04B 24/00* (2006.01)

(52) U.S. Cl. ........ 106/696; 106/724; 106/725; 106/727; 106/728; 106/729; 106/730

(58) Field of Classification Search ................. 106/724, 106/696, 725, 727, 728, 729, 730
See application file for complete search history.

(56) References Cited

U.S. PATENT DOCUMENTS

| | | | | |
|---|---|---|---|---|
| 4,082,563 A * | 4/1978 | Ellis et al. | ...................... | 106/640 |
| 4,118,241 A * | 10/1978 | Bernett | ............................ | 524/4 |
| 4,149,599 A * | 4/1979 | Chiesa, Jr. | ....................... | 169/47 |
| 4,402,752 A * | 9/1983 | Chesney, Jr. | .................. | 106/720 |
| 4,501,617 A * | 2/1985 | Desmarais | ......................... | 524/5 |
| 4,676,832 A * | 6/1987 | Childs et al. | ................... | 106/730 |
| 4,746,364 A * | 5/1988 | Kawai et al. | ..................... | 524/4 |
| 4,775,594 A * | 10/1988 | Desjarlais | ...................... | 428/421 |
| 4,778,529 A * | 10/1988 | Barker et al. | ................. | 106/726 |
| 5,294,256 A * | 3/1994 | Weigand et al. | ............. | 106/819 |
| 5,658,961 A * | 8/1997 | Cox, Sr. | .......................... | 521/65 |
| 5,716,447 A | 2/1998 | Matsuo et al. | | |
| 5,728,209 A * | 3/1998 | Bury et al. | ..................... | 106/819 |
| 5,814,146 A * | 9/1998 | Maggio et al. | ................ | 106/802 |
| 5,942,552 A * | 8/1999 | Cox | ................................ | 521/65 |
| 6,106,603 A * | 8/2000 | Skaggs et al. | .............. | 106/205.6 |
| 6,110,271 A | 8/2000 | Skaggs et al. | | |
| 6,117,226 A * | 9/2000 | Dial et al. | .................... | 106/162.8 |
| 6,153,005 A * | 11/2000 | Welker et al. | ................. | 106/677 |
| 6,225,362 B1 * | 5/2001 | Cox | ................................ | 521/65 |
| 6,262,128 B1 * | 7/2001 | Stern et al. | ....................... | 516/10 |
| 6,309,455 B1 * | 10/2001 | Skaggs et al. | .............. | 106/205.6 |
| 6,527,970 B1 * | 3/2003 | Scogin et al. | ....................... | 252/3 |
| 6,528,544 B2 * | 3/2003 | Stern et al. | ....................... | 516/10 |
| 6,709,508 B2 * | 3/2004 | Dietrich et al. | ............... | 106/724 |
| 6,800,129 B2 | 10/2004 | Jardine et al. | | |
| 6,811,605 B2 * | 11/2004 | Sasage et al. | ................. | 106/805 |
| 7,621,995 B2 * | 11/2009 | Gray | ............................ | 106/724 |
| 2002/0045684 A1 | 4/2002 | Bacher et al. | | |
| 2002/0121229 A1 * | 9/2002 | Jardine et al. | ................. | 106/681 |
| 2006/0281835 A1 | 12/2006 | Ong | | |
| 2009/0197991 A1 * | 8/2009 | Bury et al. | ........................ | 524/2 |

FOREIGN PATENT DOCUMENTS

| | | |
|---|---|---|
| EP | 1180535 A | 2/2002 |
| FR | 1 447 298 A | 11/1986 |
| GB | 2 279 655 A | 1/1995 |

OTHER PUBLICATIONS

FR 2637506 Szonyi et al. (Apr. 13, 1990) abstract only.*
International Search Report of the International Searching Authority, mailed Jan. 19, 2009, International Application No. PCT/EP2007/010549 (International Filing Date May 12, 2007).
Written Opinion of the International Searching Authority, mailed Jan. 19, 2009, International Application No. PCT/EP2007/010549 (International Filing Date May 12, 2007).

* cited by examiner

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

A cementitious composition including cement, water, and a rheology modifying additive (RMA) is provided. The inclusion of the RMA improves the cementituous composition's response to vibration, and dampens out differences due to minor fluctuations in initial slump of the composition. The RMA may include a dispersant for cementitiuous compositions. The cementitious composition may optionally include other admixtures or additives known in the industry. A method for making the cementitious composition is also provided.

29 Claims, No Drawings

RHEOLOGY MODIFYING ADDITIVE FOR CEMENTITIOUS COMPOSITIONS

CROSS REFERENCE TO RELATED APPLICATIONS

This application claims the benefit of the filing date under 35 U.S.C. §119(e) of U.S. Provisional Application For Patent Ser. No. 60/873,110 filed on Dec. 6, 2006.

TECHNICAL FIELD

Disclosed is an admixture for a cementitious composition, a cementitious composition and a method of making the cementitious composition. The cementitious composition comprising cement and the admixture exhibits improved response to vibration and differences due to minor fluctuations in initial slump.

BACKGROUND

Low slump concrete or cementitious mixtures are used in the construction industry in a variety of applications. Slip-form paving is one example where concrete is extruded in place without the use of stationary forms and the concrete must maintain its shape after it leaves the paving machine. Low slump mixtures, generally having slumps less than 3 inches, have been utilized for slip-form paving applications, because they provide some level of workability for placing the mixture while maintaining their shape after consolidation and extrusion. Other illustrative applications for low-slump mixtures include extruded in-place curb and gutter applications or sidewalk applications.

Each of these applications relies on vibration energy to facilitate placement and consolidation of the low-slump cementitious mixture. When vibration is used, the paste fraction of the mixture liquefies, thereby providing a temporary increase in workability to the otherwise low workability mixture facilitating proper consolidation. During consolidation there is an initial subsidence of the concrete due to the removal of larger air pockets, followed by a further release of smaller air voids of approximately 1 inch or less.

As the process continues, large aggregate particles re-orient themselves such that more optimal packing occurs. The result of proper consolidation is a more uniform, void free material ensuring that the designed strength and durability is achieved. Incomplete or improper consolidation can leave large voids or areas of honeycombing within the concrete leading to low compressive or flexural strengths, reduced bond to internal steel reinforcement, or weak, porous zones once setting and hardening has taken place. Due to the low workability of low slump mixtures, generally high levels of vibration energy are required to properly and fully consolidate the mixture. These high levels of vibration can lead to problems such as localized segregation or loss of entrained air due to over-vibration.

Typical slip-form pavers perform screeding, consolidating and initial finishing of concrete in-place as the paver machines move along the roadbed. The basic practice involves depositing a surplus of concrete in front of the paving machine where it is spread out by a horizontal auger, ensuring sufficient concrete depth at the sides of the paver. It is then struck off at the correct elevation and fed into a series of vibrators where it is consolidated. Establishment of the final dimensions of the slab and finishing is accomplished by extruding the mixture through horizontal and vertical forms at the rear of the paver. Concrete mixtures having very low slump (about 1") are generally desired, as these mixtures tend to maintain square edges after extrusion. However, these mixtures are sometimes difficult to consistently produce. Batch to batch variations that result in slumps lower than designed can cause a slow down in production in order to ensure that adequate vibration time is provided to properly consolidation the concrete. Slumps that are too low can also cause the paver to rise up onto the surplus concrete in the front of the paver. This changes the elevation of the machine resulting in dips and valleys of the in-place concrete.

What is needed in the industry is an additive for low-slump cementitious mixtures that improves the low slump mixture's response to vibration, and dampens out differences due to minor fluctuations in initial slump. Improving the response to vibration would allow proper consolidation to be achieved with lower vibration energy, increased production or extrusion speed, and more consistent placement of low slump cementitious mixtures. Lower vibration levels will decrease the risk for over-vibration or disruption of the entrained air-void system.

SUMMARY

Provided herein is a rheology modifying additive (RMA) for a cementitious composition, the RMA comprising an additive (A) capable of undergoing shear thinning in cementitious compositions in response to the application of energy to said cementitious composition and recovering viscosity in the absence of an application of energy to said cementitious system, and an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions.

According to certain embodiments, the RMA for a cementitious composition comprises an additive (A) capable of undergoing shear thinning in cementitious compositions in response to the application of energy to said cementitious composition and recovering viscosity in the absence of an application of energy to said cementitious system, an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, and a dispersant for said cementitious composition.

According to additional embodiments, the RMA for a cementitious composition comprises an additive (A) capable of undergoing shear thinning in cementitious compositions in response to the application of energy to said cementitious composition and recovering viscosity in the absence of an application of energy to said cementitious system, an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, and a liquid carrier.

According to further embodiments, the RMA for a cementitious composition comprises an additive (A) capable of undergoing shear thinning in cementitious compositions in response to the application of energy to said cementitious composition and recovering viscosity in the absence of an application of energy to said cementitious system, an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, a dispersant for said cementitious composition, and a liquid carrier.

Also provided herein is a cementitious composition comprising hydraulic cement, water, and a rheology modifying additive (RMA), the RMA comprising (i) an additive (A) capable of undergoing shear thinning in cementitious compositions in response to the application of energy to said cementitious composition and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions.

According to certain embodiments, the cementitious composition comprises hydraulic cement, water, and the RMA comprising (i) an additive (A) capable of undergoing shear thinning in cementitious compositions in response to the application of energy to said cementitious composition and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, (iii) and a dispersant for said cementitious composition.

According to additional embodiments, the cementitious composition comprises hydraulic cement, water, and the RMA comprising (i) an additive (A) capable of undergoing shear thinning in cementitious compositions in response to the application of energy to said cementitious composition and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, and (iii) a liquid carrier.

According to further embodiments, the cementitious composition comprises hydraulic cement, water, and the RMA comprising (i) an additive (A) capable of undergoing shear thinning in cementitious compositions in response to the application of energy to said cementitious composition and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume (low of said cementitious composition under shear conditions, (iii) a dispersant for said cementitious composition and (iv) a liquid carrier.

Additionally provided is a method of making a cementitious composition comprising mixing together hydraulic cement, water, and a rheology modifying additive for said cementitious composition, wherein said rheology modifying additive comprises (i) an additive (A) capable of undergoing shear thinning in cementitious compositions in response to the application of energy to said cementitious composition, and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions.

According to certain embodiments, the method of making a cementitious composition comprises mixing together hydraulic cement, water, and a rheology modifying additive for said cementitious composition, wherein said rheology modifying additive comprises (i) an additive (A) capable of undergoing shear thinning in cementitious compositions in response to the application of energy to said cementitious composition, and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume How of said cementitious composition under shear conditions, and (iii) a dispersant for said cementitious composition.

According to additional embodiments, the method of making a cementitious composition comprises mixing together hydraulic cement, water, and a rheology modifying additive for said cementitious composition, wherein said rheology modifying additive comprises (i) an additive (A) capable of undergoing shear thinning in cementitious compositions in response to the application of energy to said cementitious composition, and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, and (iii) a liquid carrier.

According to further embodiments, the method of making a cementitious composition comprises mixing together hydraulic cement, water, and a rheology modifying additive for said cementitious composition, wherein said rheology modifying additive comprises (i) an additive (A) capable of undergoing shear thinning in cementitious compositions in response to the application of energy to said cementitious composition, and recovering viscosity in the absence of an application of energy to said cementitious system, (ii) an additive (B) that does not undergo shear thinning when used alone in a cementitious composition in response to the application of energy to said cementitious composition, but when used in combination with additive (A), synergistically acts with additive (A) to further reduce the yield stress of said cementitious compositions to which additives (A) and (B) are added, thereby improving the volume flow of said cementitious composition under shear conditions, (iii) a dispersant for said cementitious composition, and (iv) a liquid carrier.

DETAILED DESCRIPTION

Provided is an admixture for use with cementitious compositions to improve the response of the composition to vibration energy applied to the composition and to minimize differences due to minor fluctuations in the initial slump of the composition.

The rheology modifying additive (RMA) for cementitious compositions comprises an additive (A), an additive (B), optionally a dispersant for cementitious compositions, and optionally a liquid carrier. Additive (A) comprises an agent that is capable of undergoing shear thinning in cementitious compositions in response to the application of energy to the cementitious composition which results in a decrease in the viscosity of the composition, and which can recover viscosity in the absence of an application of energy to the cementitious system. Additive (B) comprises an agent that typically does not undergo shear thinning when it is used alone in a cementitious composition in response to the application of energy to the cementitious composition, but when additive (B) is used in combination with additive (A), a synergistic RMA is provided that acts to further reduce the yield stress of the cementitious compositions to which the RMA comprising the additives (A) and (B) are added. Without being bound to any particular theory, it is believed that either the type, molecular weight, or the amount of additive (B) delivered to the cementitious composition by the RMA, or a combination of one of these three parameters, is such that additive (B) further reduces the yield stress of the cementitious composition and does not increase the viscosity of the cementitious composition. This synergistic RMA thereby improves the volume flow of cementitious compositions under shear conditions. The RMA includes the use of low levels of a certain additive (A) in combination with additive (B).

Additive A type materials are sometimes used in cementitious compositions to increase the viscosity of the mixture. However, as the dosage increases, there can be an associated reduction in the workability, slump or flow of the mixture, thereby requiring additional water or water-reducing admixture to be added to cementitious compositions to regain workability. The additional water required to achieve the target slump or workability can lower compressive strength and durability of the mixture. Additionally, increased water reducer can lead to changes in setting time such as retardation, or at the least impose an economic penalty. The synergistic effect provided by the additive combination in the RMA provides the same or improved effectiveness for a given dosage level of additive A, but without the penalty of requiring additional water or water-reducing admixture to maintain workability.

Additive (A) of the RMA may comprise materials that are capable of high viscosity build in solution and that are resistant to alkaline pH degradation. Illustrative, but non-limiting, examples of suitable additive (A) agents include polyalkylene oxides, polysaccharides, cellulose polymers, polyacrylic acids, polyacrylamides, and mixtures thereof.

According to certain embodiments, additive (A) comprises at least one polyalkylene oxide. Without limitation, suitable polyalkylene oxides include polyethylene oxides. High molecular weight polyethylene oxides having molecular weights ranging from about 1 million to about 4 million g/mol may be utilized in the admixture composition.

In other embodiments, additive (A) may comprise at least one polysaccharide. Without limitation, suitable polysaccharides include microbial polysaccharides. Illustrative examples of suitable microbial polysaccharides include welan gum, diutan gum, xanthan gum and mixtures thereof.

According to other embodiments, additive (A) may comprise at least one cellulose polymer, such as a cellulose ether. Suitable cellulose ethers comprise hydroxyalkyl cellulose, salts of carboxyalkyl cellulose, carboxyalkylhydroxyalkyl cellulose, hydroxyalkylhydroxyalkyl cellulose, and mixtures thereof. In certain embodiments, the cellulose ethers may comprise hydroxyethyl cellulose, sodium carboxymethyl cellulose, carboxymethylhydroxyethyl cellulose, hydroxymethylhydroxypropyl cellulose, and mixtures thereof.

According to other embodiments, the additive (A) included in the admixture for cementitious compositions comprises at least one polyacrylic acid. In the case that a polyacrylic acid is used as the additive (A) agent in the admixture composition, the polyacrylic acid may have a molecular weight of about 500,000 g/mol or greater.

In yet another embodiment, additive (A) comprises at least one polyacrylamide. Without limitation, a suitable polyacrylamide that may be included as additive (A) in the RMA for cementitious compositions is commercially available under the trade designation V-STAB 1/002.

Without intending to being bound to any particular theory, it is believed that the synergistic combination of additive (A) and additive (B) results in a RMA for cementitious compositions that alters the surface properties of solids that are in motion in a cementitious composition, or that alters the properties of fluid between such solids.

Without limitation, additive (B) may include at least one of a an alkyl aryl alkoxylate, an alkyl alkoxylate, a halogenated surfactant, ethylene oxide/propylene oxide block and random copolymers, a partially hydrolyzed polyvinyl alcohol, a fully hydrolyzed a polyvinyl alcohol, an alkoxylated acetylenic diol, and mixtures thereof.

According to certain embodiments, additive (B) may comprise at least one of an alkyl aryl alkoxylate, such as nonyl phenol ethoxylate, including from about 2 to about 70 moles of ethylene oxide.

According to certain embodiments, additive (B) may comprise at least one of an alkyl alkoxylate, such as an alcohol ethoxylate including from about 2 to about 41 moles ethylene oxide.

According to certain embodiments, additive (B) comprises at least one of a halogenated surfactant. Without limitation, the halogenated surfactant may be selected from fluorinated surfactants. A suitable, but non-limiting, example of a fluorinated surfactant that may be included as an additive (B) in the RMA for cementitious compositions comprises a fluorinated surfactant commercially available from Chemguard Specialty Chemicals and Equipment under the trade designation FS-9090.

According to certain embodiments, additive (B) may comprise at least one of an ethylene oxide/propylene oxide block copolymer, such as those commercially available under the trademarks PLURONIC, PLURONIC R, TETRONIC and TETRONIC R, or ethylene oxide/propylene oxide random copolymers such as those commercially available from Huntsman under the trademark JEFFOX.

According to certain embodiments, additive (B) comprises at least one of a partially hydrolyzed polyvinyl alcohol or fully hydrolyzed polyvinyl alcohol having a molecular weight from about 13,000 to about 126,000 g/mol. Suitable polyvinyl alcohols may also have molecular weights from about 13,000 to about 24,000 g/mol.

According to other embodiments, additive (B) comprises at least one alkoxylated acetylenic diol having from about 20 percent to about 85 percent alkylene oxide content. Suitable alkoxylated acetylenic diols include ethoxylated acetylenic diols may also possess an ethylene oxide content from about 65 percent to about 85 percent. The ethoxylated acetylenic diols may possess about 20, 40, 65, 85 weight percent ethylene oxide content.

The ratio of additive (A) to additive (B) present in the RMA generally falls in the range of about 1:1 to about 1:15 parts by weight based on actives. According to certain embodiments, the ratio of additive (A) to additive (B) present in the admixture is in the range of about 1:2 to about 1:11 parts by weight based on actives.

A cementitious composition is also provided. The cementitious composition comprises cement, water, and a rheology modifying additive (RMA). The RMA comprises a synergistic combination of an additive (A) and an additive (B). Additive (A) comprises an agent that is capable of undergoing shear thinning in cementitious compositions in response to the application of energy to the cementitious composition which results in a decrease in the viscosity of the composition, and which can recover viscosity in the absence of an application of energy to the cementitious system. Additive (B) comprises an agent that typically does not undergo shear thinning when it is used alone in a cementitious composition in response to the application of energy to the cementitious composition, but when additive (B) is used in combination with additive (A), a synergistic RMA is provided that acts to further reduce the yield stress of the cementitious compositions to which the RMA comprising the additives (A) and (B) are added. According to certain embodiments, the RMA included in the cementitious composition may also include a dispersant for cementitious compositions and/or a liquid carrier.

As used herein, the term cement refers to any hydraulic cement. Hydraulic cements are materials that set and harden in the presence of water. Suitable non-limiting examples of hydraulic cements include Portland cement, masonry cement, alumina cement, refractory cement, magnesia cements, such as a magnesium phosphate cement, a magnesium potassium phosphate cement, calcium aluminate cement, calcium sulfoaluminate cement, calcium sulfate hemi-hydrate cement, oil well cement, ground granulated blast furnace slag, natural cement, hydraulic hydrated lime, and mixtures thereof. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V.

The cementitious composition may also include any cement admixture or additive including set accelerators, set retarders, air-entraining agents, air detraining agents, corrosion inhibitors, pigments, wetting agents, other water soluble polymers, water repellants, fibers, dampproofing admixtures, gas formers, permeability reducers, pumping aids, fungicidal admixtures, germicidal admixtures, insecticidal admixtures, finely divided mineral admixtures, alkali-reactivity reducers, bonding admixtures, strength enhancing agents, shrinkage reducing agents, aggregates, pozzolans, and mixtures thereof.

Improvements to cementitious systems may be obtained by utilizing the rheology modifying additive alone or in combination with typical dispersants known in the industry such as lignosulfonates, naphthalene sulfonates, polycarboxylates, polyaspartates, or oligomeric dispersants. It should be noted that the RMA, or the cementitious composition, may include one type of cement dispersant or a combination of more than one type of cement dispersant.

The term dispersant as used throughout this specification includes, among others, polycarboxylate dispersants, with or without polyether units. The term dispersant is also meant to include those chemicals that also function as a plasticizer, water reducers, high range water reducers, fluidizer, antiflocculating agent, or superplasticizer for cementitious compositions, such as lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, for example, LOMAR D® dispersant (Cognis Inc., Cincinnati, Ohio), polyaspartates, oligomeric dispersants, any other chemical that functions as a dispersant or water reducer or superplasticizer for cement, and mixtures thereof.

The term polycarboxylate dispersant throughout this specification refers to polymers with a carbon backbone with pendant side chains, wherein at least a portion of the side chains are attached to the backbone through a carboxyl group or an ether group. Examples of polycarboxylate dispersants can be found in U.S. Ser. No. 09/369,562 filed on Aug. 6, 1999, U.S. Ser. No. 09/371,627 filed on Aug. 11, 1999, U.S. Ser. No. 09/212,652 filed on Dec. 16, 1998, European Patent Application Publication EP753488, U.S. Pat. No. 5,158,996, U.S. Pat. No. 6,008,275, U.S. Pat. No. 6,136,950, U.S. Ser. No. 09/592,231 filed on Jun. 9, 2000, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are incorporated herein by reference.

The polycarboxylate dispersants used in combination with the water insoluble defoamer and the solubilizing agent that solubilizes the water insoluble defoamer may be at least one of the dispersant formulas a) through j):

a) a dispersant of Formula (I):

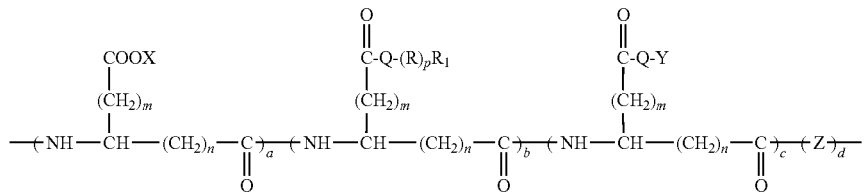

wherein in Formula (I)
- X is at least one of hydrogen, an alkali metal ion, an alkaline earth metal ion, ammonium ion, or amine;
- R is at least one of $C_1$ to $C_6$ alkyl(ene)ether or mixtures thereof or $C_1$ to $C_6$ alkyl(ene)imine or mixtures thereof;
- Q is at least one of oxygen, NH, or sulfur;
- p is a number from 1 to about 500 resulting in at least one of a linear side chain or branched side chain;
- $R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
- Y is at least one of hydrogen, an alkali metal ion, an alkaline earth metal ion, ammonium ion, amine, a hydrophobic hydrocarbon or polyalkylene oxide moiety that functions as a defoamer;
- m, m', m'', n, n', and n'' are each independently 0 or an integer between 1 and about 20;
- Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
- wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

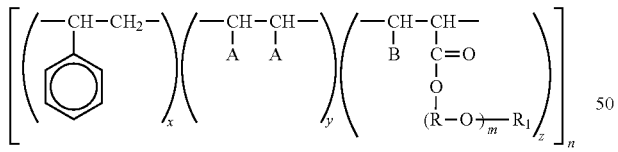

wherein in Formula (II):
- A is COOM or optionally in the "y" structure an acid anhydride group (—CO—O—CO—) is formed in place of the A groups between the carbon atoms to which the A groups are bonded to form an anhydride;
- B is COOM
- M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
- R is a $C_{2-6}$ alkylene radical;
- R1 is a $C_{1-20}$ alkyl, $C_{6-9}$ cycloalkyl, or phenyl group;
- x, y, and z are a number from 0.01 to 100;
- m is a number from 1 to 500; and
- n is a number from 10 to 100;

c) a dispersant comprising at least one polymer or a salt thereof having the form of a copolymer of
  i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
  ii) a monomer having the formula $CH_2=CHCH_2—(OA)_n OR$, wherein n is an integer from 1-90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (1):

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 500, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer(s) (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

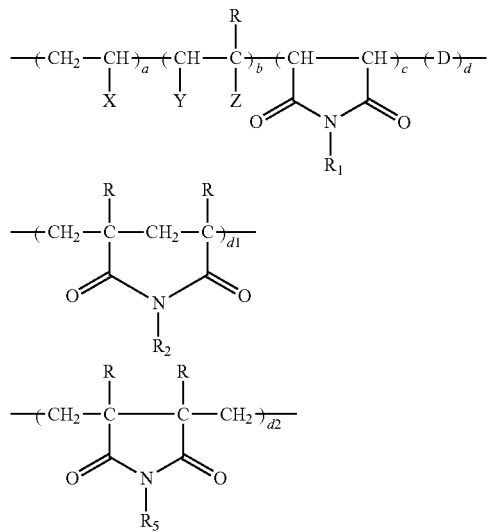

wherein in Formula (III):

D comprises at least one of a component selected from the group consisting of the structure d1, the structure d2, and mixtures thereof;

X comprises at least one of H, $CH_3$, $C_2$ to $C_6$ Alkyl, Phenyl, p-Methyl Phenyl, or Sulfonated Phenyl;

Y comprises at least one of H or —COOM;

R comprises at least one of H or $CH_3$;

Z comprises at least one of H, —$SO_3M$, —$PO_3M$, —COOM, —$O(CH_2)_nOR_3$
 where n=2 to 6,
 —$COOR_3$, or —$(CH_2)_nOR_3$ where n=0 to 6,
 —$CONHR_3$, —$CONHC(CH_3)_2CH_2SO_3M$, —$COO(CHR_4)_nOH$ where n=2 to 6, or —$O(CH_2)_nOR_4$ wherein n=2 to 6;

$R_1$, $R_2$, $R_3$, $R_5$ are each independently —$(CHRCH_2O)_mR_4$ polymer or random copolymer of oxyethylene units and oxypropylene units where m=10 to 500 and wherein the amount of oxyethylene in the polymer or random copolymer is from about 60% to 100% and the amount of oxypropylene in the polymer or random copolymer is from 0% to about 40%;

$R_4$ comprises at least one of H, Methyl, $C_2$ to about $C_6$ Alkyl, or about $C_6$ to about $C_{10}$ aryl;

M comprises at least one of H, Alkali Metal, Alkaline Earth Metal, Ammonium, Amine, triethanol amine, Methyl, or $C_2$ to about $C_6$ Alkyl;

a=0 to about 0.8;

b=about 0.2 to about 1.0;

c=0 to about 0.5;

d=0 to about 0.5;

wherein a, b, c, and d represent the mole fraction of each unit and the sum of a, b, c, and d is 1.0;

wherein each a, b, c and d unit can independently represent one component or two or more differing components in the same dispersant structure;

g) a dispersant of Formula (IV):

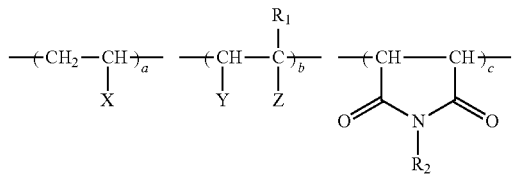

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X comprises at least one of H, $CH_3$, $C_2$ to $C_6$ Alkyl, Phenyl, p-Methyl Phenyl, p-Ethyl Phenyl, Carboxylated Phenyl, or Sulfonated Phenyl;

Y comprises at least one of H, —COOM, —COOH, or W;

W comprises at least one of a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z comprises at least one of H, —COOM, —$O(CH_2)_nOR_3$ where n=2 to 6, —$COOR_3$, —$(CH_2)_nOR_3$ where n=0 to 6, or —$CONHR_3$;

$R_1$ comprises at least one of H, or $CH_3$;

$R_2$, $R_3$, are each independently a polymer or random copolymer of oxyethylene units and oxypropylene units of the general formula —$(CH(R_1)CH_2O)_mR_4$ where m=10 to 500 and wherein the amount of oxyethylene in the polymer or random copolymer is from about 60% to 100% and the amount of oxypropylene in the polymer or random copolymer is from 0% to about 40%;

$R_4$ comprises at least one of H, Methyl, or $C_2$ to $C_8$ Alkyl;

$R_5$ comprises at least one of $C_1$ to $C_{18}$ alkyl or $C_6$ to $C_{18}$ alkyl aryl;

M comprises at least one of Alkali Metal, Alkaline Earth Metal, Ammonia, Amine, monoethanol amine, diethanol amine, methanol amine, morpholine, imidazole;

a=0.01-0.8;

b=0.2-0.99;

c=0-0.5;

wherein a, b, c represent the mole fraction of each unit and the sum of a, b, and c, is 1; and wherein each a, b, and c unit can independently represent one component or two or more differing components in the same dispersant structure;

h) a random copolymer corresponding to the following Formula (V) in free acid or salt form having the following monomer units and numbers of monomer units:

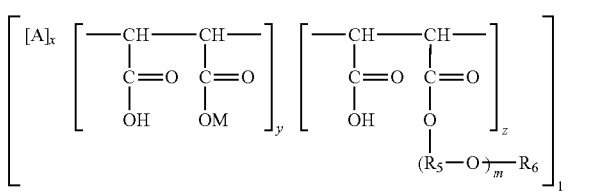

wherein A is selected from the moieties (i) or (ii)
(i) —CR₁R₂—CR₃R₄—

wherein R₁ and R₃ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, R₂ and R₄ are selected from the group consisting of hydrogen and $C_{1-4}$ alkyl, wherein R₁ and R₃ can together with R₂ and/or R₄ when R₂ and/or R₄ are $C_{1-4}$ alkyl form the ring;

R₇, R₈, R₉, and R₁₀ are individually selected from the group consisting of hydrogen, $C_{1-6}$ alkyl, and a $C_{2-8}$ hydrocarbon chain, wherein R₁ and R₃ together with R₇ and/or R₈, R₉, and R₁₀ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R₅O)ₘR₆;

R₅ is a $C_{2-8}$ alkylene radical;

R₆ is selected from the group consisting of $C_{1-20}$ alkyl, $C_{6-9}$ cycloalkyl and phenyl;

x and z are numbers from 1 to 100;

y is 0 to 100;

m is 2 to 1000;

the ratio of x to (y+ z) is from 1:10 to 10:1 and the ratio of y:z is from 5:1 to 1:100;

i) a copolymer of oxyalkyleneglycol-alkenyl ethers and unsaturated mono and/or dicarboxylic acids, comprising:

i) 0 to 90 mol % of at least one component of the formula 3a or 3b:

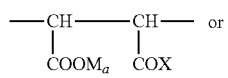

(3a)

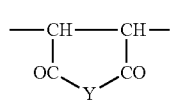

(3b)

wherein M is a hydrogen atom, a mono- or divalent metal cation, an ammonium ion or an organic amine residue, a is 1, or when M is a divalent metal cation a is ½;

wherein X is —OM₃,
—O—$(C_mH_{2m}O)_n$—R¹ in which R¹ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is independently 2 to 4, and n is 0 to 500,
—NHR², —N(R²)₂ or mixtures thereof in which R²=R¹ or —CO—NH₂; and wherein Y is an oxygen atom or —NR²;

ii) 1 to 89 mol % of components of the general formula 4:

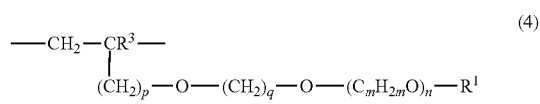

(4)

wherein R³ is a hydrogen atom or an aliphatic hydrocarbon radical containing from 1 to 5 carbon atoms, p is 0 to 3, and R¹ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is independently 2 to 4, n is 0 to 500, and q is 0 to 6; and iii) 0 to 10 mol % of at least one component of the formula 5a or 5b:

(5a)

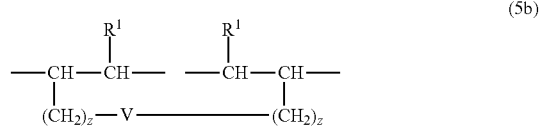

(5b)

wherein S is a hydrogen atom or —COOM₄ or —COOR⁵, T is —COOR⁵, —W—R⁷, —CO—[—NH—(CH₂)₃-]ₐ —W—R⁷, —CO—O—(CH₂)₂—W—R⁷, a radical of the general formula:

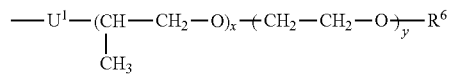

or —(CH₂)₂—V—(CH₂)₂—CH=CH—R¹, or when S is —COOR⁵ or —COOMₐ, U¹ is —CO—NHM-, —O— or —CH₂O, U² is —NH—CO—, —O— or —OCH₂, V is —O—CO—C₆H₄—CO—O— or —W—, and W is

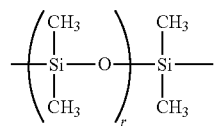

R⁴ is a hydrogen atom or a methyl radical, R⁵ is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R^6=R^1$ or

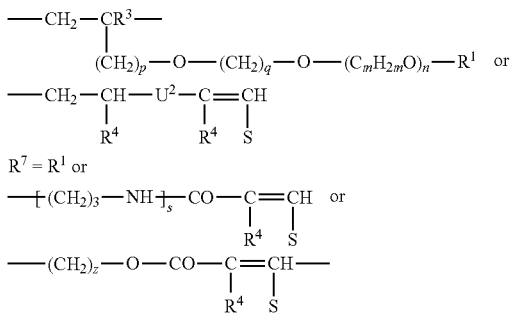

$R^7 = R^1$ or p is 0 to 3, m is independently 2 to 4, n is 0-500 and q is 0 to 6, r is 2 to 100, s is 1 or 2, x is 1 to 150, y is 0 to 15 and z is 0 to 4;

iv) 0 to 90 mol % of at least one component of the formula 6a, 6b, or 6c;

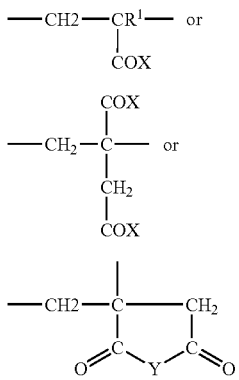

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is independently 2 to 4, and n is 0 to 500, —NH—$(C_mH_{2m}O)_n$—$R^1$, —$NHR_2$, —$N(R^2)_2$ or mixtures thereof in which $R^2=R^1$ or —CO—$NH_2$; and wherein Y is an oxygen atom or —$NR^2$;

j) a copolymer of dicarboxylic acid derivatives and oxyalkylene glycol-alkenyl ethers, comprising:

i) 1 to 90 mol. % of at least one member selected from the group consisting of structural units of formula 7a and formula 7b:

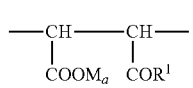

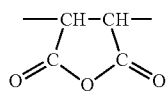

wherein M is H, a monovalent metal cation, a divalent metal cation, an ammonium ion or an organic amine;

a is ½ when M is a divalent metal cation or 1 when M is a monovalent metal cation;

wherein $R^1$ is —$OM_a$, or

—O—$(C_mH_{2m}O)_n$—$R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

m is independently 2 to 4;

n is 1 to 500;

ii) 0.5 to 80 mol. % of the structural units of formula 8:

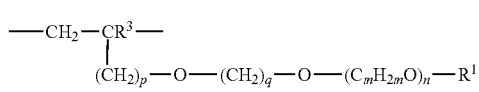

wherein $R^3$ is H or a $C_{1-5}$ aliphatic hydrocarbon;

p is 0 to 3, q is 0 to 6;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_4$, —$(SO_3)M_a$, and —$(PO_3)M_{a2}$;

m is independently 2 to 4;

n is 1 to 500;

iii) 0.5 to 80 mol. % structural units selected from the group consisting of formula 9a and formula 9b:

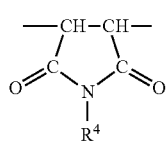

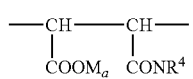

wherein $R^4$ is H, $C_{1-20}$ aliphatic hydrocarbon that is optionally substituted with at least one hydroxyl group, —$(C_mH_{2m}O)_n$—$R^2$, —CO—NH—$R^2$, $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —COOM$_a$, —(SO$_3$)M$_a$, and —(PO$_3$)M$_{a2}$;
m is independently 2 to 4;
n is 1 to 500;

iv) 1 to 90 mol. % of structural units of formula 10

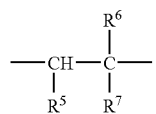
(10)

wherein R$^5$ is methyl, or methylene group, wherein R$^5$ forms one or more 5 to 8 membered rings with R$^7$;
R$^6$ is H, methyl, or ethyl;
R$^7$ is H, a C$_{1-20}$ aliphatic hydrocarbon, a C$_{6-14}$ aryl that is optionally substituted with at least one member selected from the group consisting of —COOM$_a$, —(SO$_3$)M$_a$, and —(PO$_3$)M$_{a2}$, C$_{5-8}$ cycloaliphatic hydrocarbon, —OCOR$^4$, —OR$^4$, and —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{3-5}$ cycloaliphatic hydrocarbon, or a C$_{6-14}$ aryl residue that is optionally substituted with a member selected from the group consisting of —COOM$_a$, —(SO$_3$)M$_a$, and —(PO$_3$)M$_{a2}$; and,
m is independently 2 to 4 and n is 1 to 500.

In formula (e) the word "derived" does not refer to derivatives in general, but rather to any polycarboxylic acid/salt side chain derivatives of oligoalkylene glycols, polyalcohols and polyalkylene glycols that are compatible with dispersant properties and do not destroy the graft polymer.

The substituents in the optionally substituted aryl radical containing 6 to 14 carbon atoms, may be hydroxyl, carboxyl, C$_{1-14}$ alkyl, or sulfonate groups. The substituents in the substituted benzene may be hydroxyl, carboxyl, C$_{1-14}$ alkyl, or sulfonate groups.

The polycarboxylate dispersants used in the admixture, cementitious composition and method may include but is not limited to dispersants or water reducers sold under the trademarks GLENIUM® (BASF Construction Chemicals—Admixtures Systems, Cleveland, Ohio), ADVA® (W. R. Grace Inc., Cambridge, Mass.). VISCOCRETE® (Sika, Zurich, Switzerland), and SUPERFLUX® (Axim Concrete Technologies Inc., Middlebranch, Ohio).

The term oligomeric dispersant refers to oligomers that are a reaction product of: component A, optionally component B, and component C; wherein each component A is independently a nondegradable, functional moiety that adsorbs onto a cementitious particle; wherein component B is an optional moiety, where if present, each component B is independently a nondegradable moiety that is disposed between the component A moiety and the component C moiety; and wherein component C is at least one moiety that is a linear or branched water soluble, nonionic polymer substantially non-adsorbing to cement particles. Oligomeric dispersants are disclosed in U.S. Pat. No. 6,133,347, U.S. Pat. No. 6,492,461, and U.S. Pat. No. 6,451,881, which are hereby incorporated by reference, as if fully written out below.

The term polyaspartate dispersant refers to a polymer dispersant comprising a functionalized, hydrophilic, oligomeric or polymeric, side chain substituted polyimide or polyamide main chain polymer. The side chains may include linking amides, esters, and thioesters. The polyaspartate dispersant is water soluble and may be substantially non-crosslinked. Illustrative polyaspartate dispersants are disclosed in U.S. Pat. No. 6,136,950, and U.S. Pat. No. 6,284,867, U.S. Pat. No. 6,429,266, which are hereby incorporated by reference, as if fully written out below.

The amount of additive (A) that is delivered to the cementitious composition by the RMA is in the range of greater than 0 percent to about 0.0025 percent actives based on the dry weight of the cementitious composition. The amount of additive (A) that is delivered to the cementitious composition by the RMA is in the range of greater than 0 percent to about 0.0001 percent actives based on the dry weight of the cementitious composition.

The amount of additive (A) that is delivered to the cementitious composition by the RMA may also be in the range of about 0.0005 percent to about 0.025 percent actives based on the dry weight of the cementitious content. The amount of additive (A) delivered by the RMA to the cementitious composition may also be in the range of about 0.0005 percent to about 0.01 percent actives based on the dry weight of the cementitious content.

The amount of additive (B) delivered by the RMA to the cementitious composition is in the range of about 0.001 percent to about 0.05 percent actives based on the weight of the cementitious content. The amount of additive (B) delivered by the RMA to the cementitious composition may also be in the range of about 0.001 percent to about 0.03 percent actives based on the weight of the cementitious content.

For embodiments of the cementitious composition that further include a dispersant for cementitious compositions, the dispersant may be present in the range of about 0.001 percent to about 2.0 percent based on the weight of the cementitious content.

Listed below are several non-limiting examples of admixtures and additives that can be used with the present cementitious compositions. U.S. Pat. No. 5,728,209 to Bury et al., which is incorporated herein by reference, contains a detailed description of different types of admixtures.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates: and salts of sulfonated hydrocarbons. Air entrainers are added in an amount to yield a desired level of air in a cementitious composition. Generally, the amount of air entrainers in a cementitious composition ranges from about 0.2 to about 5.0 fluid ounces per hundred pounds of cement. But this can vary widely due to variations in materials, mix proportion, temperature, and mixing action.

Retarding, or delayed-setting, admixtures are used to retard, delay, or slow the rate of setting of concrete. They can be added to the concrete mix upon initial batching or sometime after the hydration process has begun. Retarders are used to offset the accelerating effect of hot weather on the setting of concrete, or delay the initial set of concrete or grout when difficult conditions of placement occur, or problems of delivery to the job site, or to allow time for special finishing processes or to aid in the reclamation of concrete left over at the end of the work day. Most retarders also act as water reducers and can also be used to entrain some air into concrete. Lignosulfonates, hydroxylated carboxylic acids, lignin, borax, gluconic, tartaric and other organic acids and their corresponding salts, phosphonates, certain carbohydrates and mixtures thereof can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Alkali-reactivity reducers can reduce the alkali-aggregate reaction and limit the disruptive expansion forces in hardened concrete. Pozzolans (fly ash, silica fume), blast-furnace slag, salts of lithium and barium are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cement, or to increase slump. Typically, water reducers will reduce the water content of the concrete mixture by approximately up to 15%.

Superplasticizers are high-range water reducers, or water-reducing admixtures. They are added to concrete to make high-slump, flowing concrete, and thus reduce the water-cement ratio. These admixtures produce large water reduction or great flowability without causing undue set retardation or entrainment of air in mortar or concrete. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safely reasons. These coloring admixtures are usually composed of pigments and include carbon black, iron oxide, phthalocyanine, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust grout properties to achieve a desired result for specific applications. For example, portland cement grouts are used for a variety of different purposes, each of which may require a different agent to stabilize foundations, set machine bases, fill cracks and joints in concrete work, cement oil wells, fill cores of masonry walls, and grout pre-stressing tendons and anchor bolts, and fill the voids in pre-placed aggregate concrete.

Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolan will chemically react with calcium hydroxide at ordinary temperatures to form compounds possessing cementitious properties.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fresh concrete can sometimes be harsh because of faulty mixture proportions or certain aggregate characteristics such as particle shape and improper grading. Under these conditions, entrained air which acts like a lubricant, can be used as a workability improving agent. Other workability agents are water reducers and certain finely divided admixtures.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, consisting essentially of hydraulic calcium silicates, all usually containing one or more of the forms of calcium sulfate as an interground addition with ASTM types, I, II, III, IV, or V. The finely divided mineral admixtures can be classified according to their chemical or physical properties as: cementitious materials; pozzolans; pozzolanic and cementitious materials; and nominally inert materials. Cementitious materials are materials that alone have hydraulic cementing properties, and set and harden in the presence of water. Included in cementitious materials are ground granulated blast-furnace slag, natural cement, hydraulic hydrated lime, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C-618.

In the construction field, many methods of strengthening concrete have been developed through the years. One modern method involves distributing fibers throughout a fresh concrete mixture. Upon hardening, this concrete is referred to as fiber-reinforced concrete. Fibers can be made of zirconium materials, steel, fiberglass, or synthetic materials, e.g., polypropylene, nylon, polyethylene, polyester, rayon, high-strength aramid, (i.e. KEVLAR®), or mixtures thereof.

The cementitious composition can also include fine aggregates, coarse aggregates, pozzolans, air (either entrapped or purposefully entrained), clay, and pigments.

The fine aggregates are materials that pass through a Number 4 sieve (ASTM C125 and ASTM C33), such as natural or manufactured sand. The coarse aggregates are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

According to certain embodiments, a method of making a cementitious composition is provided. The method includes mixing together hydraulic cement, water, and a rheology modifying additive (RMA) comprising the above described additive (A) and additive (B) to form a cementitious composition. According to further embodiments, the method of making a cementitious composition includes mixing together hydraulic cement, aggregates, water, and a rheology modifying additive (RMA) comprising the above described additive (A) and additive (B) to form a cementitious composition.

Useful applications for the cementitious composition prepared with the addition of a rheology modifying additive (RMA) include low slump slip-form paving, in-place extrusion of sidewalks, curbs, or gutters, extrusion of cementitious articles such as highway median barriers and concrete pipe. Additional applications include but are not limited to no-fines pervious concrete where difficult handling and compactability is improved, self consolidating concrete (SCC) where passing ability of the large aggregate through congested rebar is improved, and any normal slump concrete that can benefit from an improved response to vibration or improved surface finishability.

Production speeds for many applications including paving applications can be increased, because the cementitious composition is more easily consolidated, but without the increased risk of edge slumping once the vibration is removed. The use of the cementitious composition allows for quick and consistent placement and proper consolidation with lower vibration energy requirements.

EXAMPLES

The following examples are provided for the purpose of describing illustrative embodiments in greater detail. The following examples should not be construed as limiting the scope of the admixture, cementitious composition, or method for preparing the cementitious composition in any manner.

Concrete mixtures in the following examples were proportioned according to the guidelines set forth in ACI 211, "Guide for Proportioning Normal Weight Concrete". Mixing was carried out according to the guidelines set forth in ASTM C192, with the exception that a 5 minute mixing time was used.

The concrete mix proportions in the following examples were based on a 564 lb/yd$^3$ cement factor using a Type I/II Portland cement, natural sand and a #57 coarse aggregate conforming the grading specification outlined in ASTM C 33. Different water to cement ratios were used between the examples, but within a set of mixes, water contents were kept relatively constant.

The following tests were used: Slump (ASTM C143), Air Content (ASTM C231). An additional test procedure was used to quantify the How and deformation speed of concrete during vibration. This test used an "L" shaped box attached to a laboratory vibrating table. A description of the apparatus can be found in "State of the Art Report of RILEM Technical Committee 174-SCC", RILEM publication, 2000, page 126.

The analysis also included testing of the rheological properties of bulk concrete mixtures using an IBB concrete rheometer which provides comparative values for plastic viscosity and yield stress of the cementitious mixtures. Plastic viscosity is reported in units of N·m·s (newton-meter-second) and yield stress is reported in N·m (newton-meter).

After filling the vertical leg of the form, a vertical gate was removed and vibration was applied in 10 second intervals. The drop in concrete height in the vertical leg was used to calculate the volume of concrete that had flowed into the lower section. The concrete response to vibration is shown as volume flow in cubic inches/second. Higher values of volume flow indicate that for the same level of applied vibration energy the concrete response was improved. All additives were prepared as solutions prior to addition to the concrete mixture. Amounts shown for the various additives are based on percent active solids by weight of cement.

All of the mixes in Table 1 contained PCE dispersant at 0.04% by cement weight. The mixes included polyvinyl alcohol, polyacrylic acid, or polyethylene oxide, in combination with the PCE dispersant. Each mix was evaluated for slump, air content and volume flow. Viscosity and yield stress of the cementitious mixtures are also reported.

TABLE 1

| Mix | Additive | Cement lbs/yd$^3$ | Sand lbs/yd$^3$ | Stone lbs/yd$^3$ | Water lbs/yd$^3$ | Slump | Air % | Volume Flow | Viscosity | Yield Stress |
|---|---|---|---|---|---|---|---|---|---|---|
| C1 | PCE | 567 | 1185 | 1911 | 277 | 2.75 | 2.2 | 25.9 | 4.32 | 3.67 |
| C2 | PVA 126K @ 0.005% | 565 | 1182 | 1906 | 279 | 3 | 2.3 | 25.2 | 4.47 | 2.97 |
| C3 | PVA 126K @ 0.010% | 567 | 1186 | 1912 | 277 | 3.5 | 2.2 | 22.9 | 4.34 | 2.87 |
| C4 | Airvol PVA @ 0.005% | 565 | 1183 | 1906 | 277 | 3.75 | 2.4 | 21.4 | 3.65 | 2.4 |

TABLE 1-continued

| Mix | Additive | Cement lbs/yd³ | Sand lbs/yd³ | Stone lbs/yd³ | Water lbs/yd³ | Slump | Air % | Volume Flow | Viscosity | Yield Stress |
|---|---|---|---|---|---|---|---|---|---|---|
| C5 | Airvol PVA @ 0.010% | 568 | 1188 | 1916 | 272 | 3.25 | 2.3 | 23.6 | 4.47 | 3 |
| C6 | PAA 1.25 mil @ 0.010% | 568 | 1188 | 1915 | 271 | 3.75 | 2.4 | 35.9 | — | — |
| C7 | PEO 1 mil @ 0.005% | 564 | 1180 | 1902 | 280 | 3.25 | 2.4 | 38.9 | — | — |

PCE = polycarboxylate dispersant
PVA = polyvinyl alcohol
PAA = polyacrylic acid
PEO = polyethylene oxide PVA additives, examples C2-C5, demonstrate no improvement in volume flow compared to the PCE only reference (example C1). The polyacrylic acid 1.25 million molecular weight (example C6) and PEO 1 million molecular weight (example C7) additives did demonstrate an improved volume flow compared to the PCE only reference Example mixes C8, C9, 10 and 11 in Table 2 contained PCE dispersant at 0.04% by cement weight. Mixes C9, 10 and 11 included a polyethylene oxide in combination with the PCE dispersant. Mix C9 did not include an additive (B) component. Mix 10 further included polyvinyl alcohol as an additive (B) in combination with the polyethylene oxide, and Mix 11 further included an acetylenic diol as the additive (B) component in combination with the polyethylene oxide. Example mixes C12 and 13-15 were carried out in a separate mix series and contained PCE dispersant at 0.045% in combination with a polyethylene oxide. Mix C12 did not include an additive (B) component. Mix 13 further included ethoxylated nonyl phenol as an additive (B) in combination with the polyethylene oxide. Mix 14 further included a fluorinated surfactant as the additive (B) component in combination with the polyethylene oxide, and Mix 15 further included an EO/PO block polymer as the additive (B) component in combination with the polyethylene oxide. Each mix was evaluated for slump, air content and volume flow.

Examples 10 and 11 which include an RMA comprising PEO as the additive (A) component in combination with PVA 126K or acetylenic diol as the additive (B) component, demonstrate a surprisingly significant improvement in volume flow, as compared to Mix C9. Examples 13-15 which include an RMA comprising PEO as the additive (A) component in combination with ethoxylated nonyl phenol, fluorinated surfactant, or EO/PO block polymer as the additive (B) component, demonstrate a significant improvement in volume flow, as compared to Mix C12.

Table 2a shows the viscosity and yield stress for the cementitious compositions of the mixes of Table 2.

TABLE 2a

| Mix | Viscosity | Yield Stress |
|---|---|---|
| C8 | 3.3 | 5.7 |
| C9 | 3.5 | 4.0 |
| 10 | 3.1 | 3.4 |
| 11 | 2.9 | 2.5 |
| C12 | 5.8 | 6.6 |
| 13 | 5.0 | 3.2 |
| 14 | 5.3 | 5.2 |
| 15 | 4.9 | 4.9 |

TABLE 2

| Mix | Additive | Cement lbs/yd³ | Sand lbs/yd³ | Stone lbs/yd³ | Water lbs/yd³ | Slump | Air % | Volume Flow |
|---|---|---|---|---|---|---|---|---|
| C8 | PCE | 570 | 1195 | 1873 | 289 | 1.50 | 2.1 | 19.8 |
| C9 | PEO 1 mil @ 0.005% | 569 | 1192 | 1868 | 292 | 2.25 | 2.1 | 33.6 |
| 10 | PEO 1 mil @ 0.005% + PVA 126K @ 0.009% | 567 | 1189 | 1863 | 292 | 2.75 | 2.3 | 41.2 |
| 11 | PEO 1 mil @ 0.005% + acetylenic diol (65) @ 0.010% | 566 | 1186 | 1858 | 290 | 3.00 | 2.6 | 45 |
| C12 | POE 400: 4 mil @ 0.0015% | 565 | 1398 | 1852 | 266 | 2.00 | 2.5 | 17.6 |
| 13 | POE 400: 4 mil @ 0.0015% + NP-6 @ 0.01% | 561 | 1388 | 1838 | 264 | 2.75 | 3.2 | 19.8 |
| 14 | POE 400: 4 mil @ 0.0015% + FS @ 0.0075% | 562 | 1391 | 1842 | 263 | 2.25 | 3.1 | 19.8 |
| 15 | POE 400: 4 mil @ 0.0015% + 25R2 @ 0.015% | 568 | 1407 | 1863 | 261 | 2.50 | 2.3 | 39.7 |

PCE = polycarboxylate dispersant
PEO = polyethylene oxide
PVA = polyvinyl alcohol
NP-6 = nonylphenol with 6 moles EO
FS = fluorinated surfactant
25R2 = Pluronic EO/PO block polymer Example mixes C16, C21 and C25 all contained a commercially available lignosulfonate based admixture typically used for concrete paving where mix C25 had a slightly higher dosage and lower water content. Mixes C17, 18, C19 and 20 all contained PCE dispersant at 0.041% by cement weight, mixes C22, 23 and 24 all contained PCE dispersant at 0.045%, and mixes C26, 27 and 28 all contained PCE dispersant at 0.067%. The amount of PCE was selected to provide the same slump when using the same water content as the reference lignosulfonate admixture.

TABLE 3

| Mix | Additive | Cement lbs/yd³ | Sand lbs/yd³ | Stone lbs/yd³ | Water lbs/yd³ | Slump | Air % | Volume Flow |
|---|---|---|---|---|---|---|---|---|
| C16 | Lignin admixture | 561 | 1247 | 1839 | 283 | 2.5 | 2.5 | 30.5 |
| C17 | PEO 400: 4 mil @ 0.0015% | 559 | 1253 | 1834 | 287 | 2.5 | 2.3 | 34.3 |
| 18 | PEO 400: 4 mil @ 0.0015% + acetylenic diol (65) @ 0.005% | 559 | 1253 | 1834 | 287 | 2.75 | 2.3 | 45.8 |
| C19 | HEC @ 0.003% | 561 | 1256 | 1839 | 281 | 1.75 | 2.4 | 28.2 |
| 20 | HEC @ 0.003% + acetylenic diol (65) @ 0.005% | 560 | 1255 | 1838 | 282 | 2.25 | 2.4 | 41.2 |
| C21 | Lignin admixture | 562 | 1313 | 1845 | 259 | 0.75 | 2.5 | 13.7 |
| C22 | diutan gum @ 0.00062 | 561 | 1305 | 1840 | 263 | 0.75 | 2.6 | 13.7 |
| 23 | diutan gum @ 0.00062% + PVA 124K @ 0.007% | 561 | 1305 | 1840 | 261 | 0.75 | 2.7 | 22.9 |
| 24 | diutan gum @ 0.00062% @ PVA 23K @ 0.007% | 562 | 1307 | 1843 | 261 | 0.75 | 2.6 | 19.8 |
| C25 | Lignin admixture | 562 | 1321 | 1844 | 255 | 0.75 | 2.6 | 9.2 |
| C26 | diutan gum @ 0.0009% | 561 | 1323 | 1842 | 253 | 0.75 | 2.7 | 10.7 |
| 27 | diutan gum @ 0.0009% + PVA 124K @ 0.0104% | 558 | 1316 | 1831 | 254 | 0.75 | 3.1 | 18.3 |
| 28 | diutan gum @ 0.0009% + PVA 23K @ 0.0104% | 559 | 1317 | 1834 | 256 | 1 | 2.9 | 27.5 |

PEO = polyethylene oxide
HEC = hydroxyethyl cellulose
PVA = polyvinyl alcohol

Example 18 and 20, which include an RMA comprising an additive (A) component (PEO 400:4 million or HEC) and an additive (B) component (acetylenic diol) demonstrate a significant improvement in volume flow, as compared to the PEO 400:4 million or HEC only (examples C17, C19). Examples 23, 24, 27 and 28, which includes the RMA comprising an additive (A) (diutan gum) and an additive (B) (PVA 23K or 124K) demonstrate a significant improvement in volume flow, as compared to the diutan gum only (examples C22 and C26) or lignosulfonate based admixture only references (examples C21 and C25).

Table 3a shows the viscosity and yield stress for the cementitious compositions of the mixes of Table 3.

TABLE 3a

| Mix | Viscosity | Yield Stress |
|---|---|---|
| C16 | 3.8 | 4.5 |
| C17 | 3.4 | 3.6 |
| 18 | 3.4 | 3.0 |
| C19 | 4.0 | 4.8 |
| 20 | 3.3 | 3.6 |
| C21 | 3.1 | 8.1 |
| C22 | 3.2 | 8.1 |
| 23 | 3.4 | 7.8 |
| 24 | 3.8 | 7.6 |
| C25 | 3.4 | 9.1 |
| C26 | 3.9 | 9.3 |
| 27 | 4.1 | 7.3 |
| 28 | 4.3 | 6.9 |

A comparison between a nominal slump concrete mixture and a mixture containing the rheology modifying additive (RMA) was carried out. Mix C29 was a control plain reference mixture that did not contain and dispersant or RMA. Mix 30 contained PCE at 0.045% based on the cement weight and an RMA composed of a blend of polysaccharide (additive (A)) and poly vinyl alcohol (additive (B)).

TABLE 4

| Mix | Additive | Water | Slump | Air % | Volume Flow |
|---|---|---|---|---|---|
| C29 | Plain reference | 289 | 6.50 | 2.5 | 43.5 |
| 30 | diutan gum @ 0.0007% + PVA 23K @ 0.0068% | 273 | 6.50 | 2.9 | 51.1 |

PVA = polyvinyl alcohol

Example 30 demonstrates that the inclusion of the RMA improves the volume flow performance of the mixture as compared to the plain reference (mix C29), yet the slump and air content of the example 30 are similar to the plain reference.

Several SCC's (self-consolidating concrete mixtures) were prepared with 800 lb/yd³ cement content. Water contents were fixed and PCE dispersant was added to obtain a slump flow spread of approximately 20 inches. In order to maintain low air contents, 0.003% by cement weight tributyl phosphate defoamer was added to each mix.

TABLE 4a

| Mix | Additive | Water | PCE | Slump Flow | Air % |
|---|---|---|---|---|---|
| C31 | SCC reference | 283 | 0.094 | 21.75 | 2 |
| 32 | Diutan gum @ 0.0016% | 283 | 0.101 | 21.5 | 2 |
| 33 | diutan gun @ 0.001% + PVA 23K @ 0.010% | 283 | 0.105 | 23.5 | 2 |
| 34 | Diutan gum @ 0.0027% | 283 | 0.094 | 19.75 | 2 |
| 35 | diutan gum @ 0.0016% + PVA 23K @ 0.017% | 281 | 0.094 | 21.75 | 2.7 |

SCC = Self Consolidating Concrete
PVA = polvvinyl alcohol

Table 4b shows the viscosity and yield stress for the cementitious compositions of the mixes of Table 4a.

TABLE 4a

| Mix | Viscosity | Yield Stress |
|---|---|---|
| C31 | 5.0 | 0.2 |
| 32 | 4.6 | 0.2 |
| 33 | 3.5 | 0 |
| 34 | 4.4 | 0.4 |
| 35 | 4.3 | 0.1 |

Examples 32 and 34 demonstrate that when an additive (A) component alone is included in a SCC composition, there is an associated decrease in the slump flow of the composition. Example 32 demonstrates that when an additive (A) is added to a SCC composition, it is necessary to increase the level of dispersant in order to maintain slump flow, as compared to SCC reference Mix C31. Example 34 shows that at the same dispersant level as the reference, there is a reduction of slump flow when an additive (A) component is added alone. Example 33 demonstrates that the use of the RMA, comprising a combination of diutan gum and PVA 23K, in combination with the same PCE dispersant dosage as used with additive (A) alone (C32), provided an additional 2 inches of spread at the same water content as compared to the SCC reference (C31) containing PCE dispersant only. Example 35 demonstrates that the RMA, comprising a combination of diutan gum and PVA 23K, used in combination with an identical PCE dispersant dosage and nearly identical water content as the reference, provides a similar slump flow value, as the SCC reference (C31). In these examples, the shear forces acting on the already highly flowable mixture were extremely low, stemming from flow of concrete under its own self-weight. This indicates that the rheology modifying additive provided an improved response to shear, as evidenced by the additional spread of the flowable mixture.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired results.

I claim:
1. A low slump cementitious composition comprising: hydraulic cement; water; and a rheology modifying additive comprising:
   (i) an additive (A) that undergoes shear thinning in low slump cementitious compositions in response to the application of energy to said low slump cementitious composition, and recovering viscosity in the absence of an application of energy to said low slump cementitious composition, and
   (ii) an additive (B) that does not undergo shear thinning when used alone in a low slump cementitious composition in response to the application of energy to said low slump cementitious composition, but when used in combination with additive (A), synergistically acts with additive (A) to further reduce the yield stress of said low slump cementitious composition to which additives (A) and (B) are added, thereby improving the volume flow of said low slump cementitious composition under shear conditions,
   wherein the low slump cementitious composition has a slump of less than 3 inches,
   wherein said additive (A) is present in amount from about 0.0005 percent to about 0.025 percent by weight of cementitious content, and
   wherein said additive (B) is present in an amount from about 0.001 percent to about 0.05 percent by weight of cementitious content.

2. The composition of claim 1, wherein the hydraulic cement is selected from the group consisting of portland cement, masonry cement, high alumina cement, refractory cement, magnesia cement, calcium sulfate hemi-hydrate cement, calcium sulfoaluminate cement and mixtures thereof.

3. The cementitious composition of claim 1, further comprising a cement admixture or additive selected from the group consisting of set accelerators, set retarders, air-entraining or air detraining agents, corrosion inhibitors, pigments, wetting agents, water soluble polymers, water repellants, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, strength enhancing agents, shrinkage reducing agents, aggregates, pozzolans, dispersants and mixtures thereof.

4. The cementitious composition of claim 1, further comprising at least one of (i) a dispersant for cementitious compositions and (ii) a liquid carrier.

5. The cementitious composition of claim 4, wherein said dispersant is selected from the group consisting of lignosulfonates, naphthalene sulfonates, polycarboxylates, polyaspartates, oligomerics and mixtures thereof.

6. The cementitious composition of claim 1, wherein the cement composition comprises a self consolidating cementitious composition.

7. The cementitious composition of claim 1, wherein said additive (A) is present in an amount from about 0.0005 percent to about 0.01 percent by weight of cementitious content.

8. The cementitious composition of claim 1, wherein said additive (B) is present in an amount from about 0.001 percent to about 0.03 percent by weight of cementitious content.

9. The cementitious composition of claim 5, wherein said dispersant is present in an amount from about 0.001 percent to about 2 percent by weight of cementitious content.

10. The cementitious composition of claim 1, wherein said additive (A) is at least one of a polyalkylene oxide, a polysaccharide, a cellulose polymer, polyacrylic acid, or a polyamide.

11. The cementitious composition of claim 10, wherein said additive (A) comprises a polyalkylene oxide.

12. The cementitious composition of claim 11, wherein said polyalkylene oxide comprises polyethylene oxide.

13. The cementitious composition of claim 12, wherein the weight average molecular weight of said polyethylene oxide is from about 1 million to about 4 million g/mol.

14. The cementitious composition of claim 10, wherein said additive (A) comprises a polysaccharide.

15. The cementitious composition of claim 14, wherein said polysaccharide comprises a microbial polysaccharide.

16. The cementitious composition of claim 15, wherein said microbial polysaccharide is selected from the group consisting of welan gum, diutan gum, xanthan gum and mixtures thereof.

17. The cementitious composition of claim 10, wherein said additive (A) comprises a cellulose polymer.

18. The cementitious composition of claim 17, wherein said cellulose polymer comprises a cellulose ether.

19. The cementitious composition of claim 18, wherein said cellulose ether is selected from the group consisting of hydroxyalkyl cellulose polymers, carboxyalkyl cellulose polymers, salts of carboxyalkyl cellulose polymers, carboxyalkylhydroxyalkyl cellulose polymers, hydroxyalkyhydroxyalkyl cellulose polymers, and mixtures thereof.

20. The cementitious composition of claim 10, wherein said additive (A) comprises polyacrylic acid having a weight average molecular weight of about 500,000 g/mol or greater.

21. The cementitious composition of claim 1, wherein said additive (B) comprises at least one of an alkyl aryl alkoxylate, an alkyl alkoxylate, a fluorinated surfactant, ethylene oxide/propylene oxide block and random copolymers, a partially hydrolyzed polyvinyl alcohol, fully hydrolyzed polyvinyl alcohol, or alkoxylated acetylenic diols.

22. The cementitious composition of claim 21, wherein said additive (B) comprises at least one of a partially hydrolyzed polyvinyl alcohol or fully hydrolyzed polyvinyl alcohol having a weight average molecular weight from about 13,000 to about 126,000 g/mol.

23. The cementitious composition of claim 22, wherein the weight average molecular weight of the partially hydrolyzed polyvinyl alcohol or fully hydrolyzed polyvinyl alcohol is from about 13,000 to about 24,000 g/mol.

24. The cementitious composition of claim 21, wherein said alkoxylated acetylenic diol comprises an ethoxylated acetylenic diol comprising from about 20 percent to about 85 percent ethylene oxide content.

25. The cementitious composition of claim 24, wherein the ethoxylated acetylenic diol comprises from about 65 percent to about 85 percent ethylene oxide content.

26. A method of making a low slump cementitious composition comprising mixing together hydraulic cement, water, and a rheology modifying additive for said low slump cementitious composition, wherein said rheology modifying additive comprises (i) an additive (A) that undergoes shear thinning in low slump cementitious compositions in response to the application of energy to said low slump cementitious composition, and recovering viscosity in the absence of an application of energy to said low slump cementitious composition, and (ii) an additive (B) that does not undergo shear thinning when used alone in a low slump cementitious composition in response to the application of energy to said low slump cementitious composition, but when used in combination with additive (A), synergistically acts with additive (A) to further reduce the yield stress of said low slump cementitious composition to which additives (A) and (B) are added, thereby improving the volume flow of said low slump cementitious composition under shear conditions wherein the low slump cementitious composition has a slump of less than 3 inches, wherein said additive (A) is present in amount from about 0.0005 percent to about 0.025 percent by weight of cementitious content, and wherein said additive (B) is present in an amount from about 0.001 percent to about 0.05 percent by weight of cementitious content.

27. The method of claim 26, wherein said rheology modifying additive further comprises at least one of (i) a dispersant for cementitious compositions and (ii) a liquid carrier.

28. The method of claim 26, further comprising mixing aggregates with said cement, water and rheology modifying additive.

29. The cementitious composition of claim 1, wherein additive (B) does not increase the viscosity of the cementitious mixture.

* * * * *